April 15, 1952
W. D. McGUIGAN
2,592,719
REMOTE DIRECTION FINDER SYSTEM
Filed Nov. 19, 1949
2 SHEETS—SHEET 1
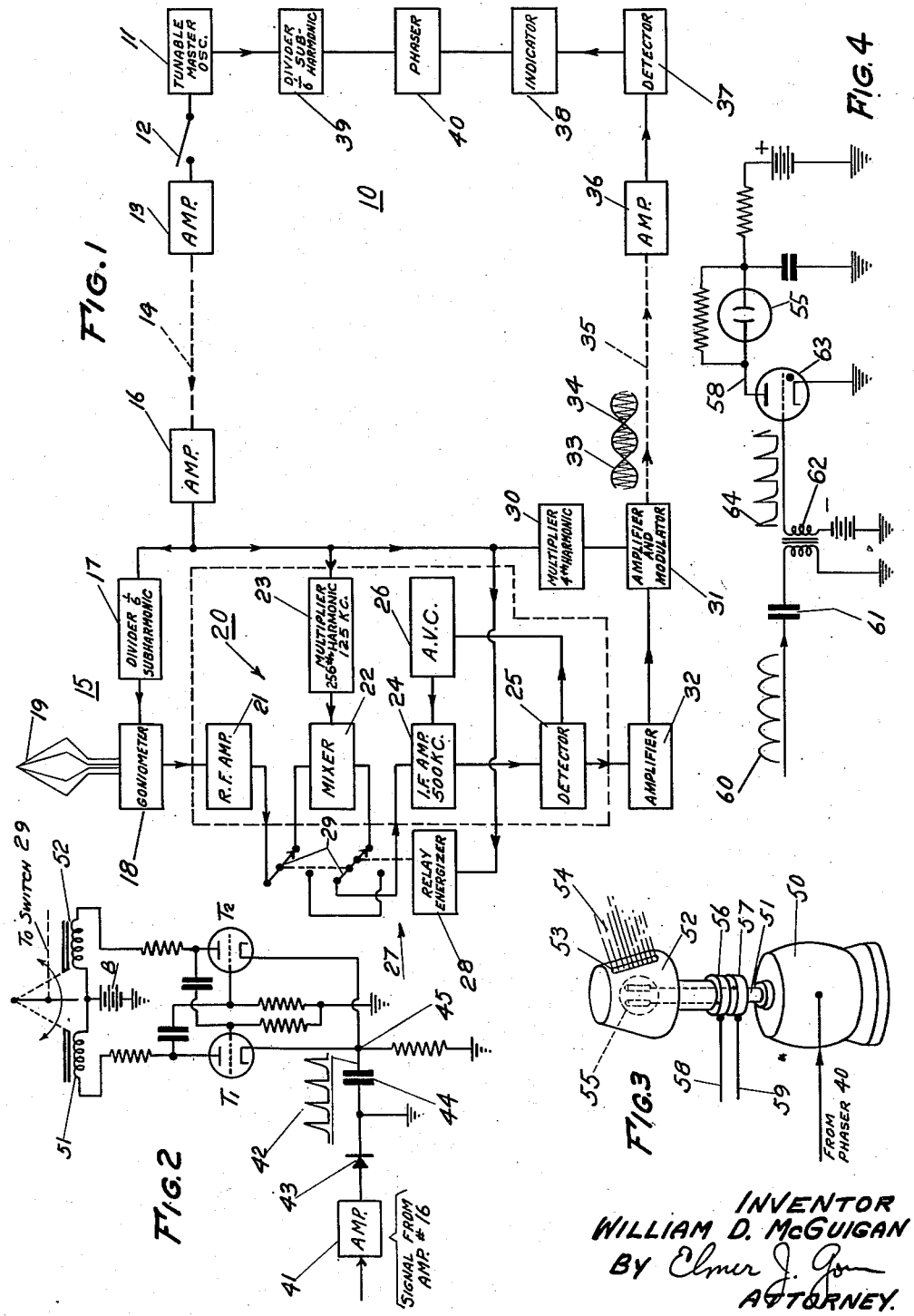
INVENTOR
WILLIAM D. McGUIGAN
BY Elmer J. Go—
ATTORNEY April 15, 1952     W. D. McGUIGAN     2,592,719
REMOTE DIRECTION FINDER SYSTEM Filed Nov. 19, 1949     2 SHEETS—SHEET 2

INVENTOR
WILLIAM D. McGUIGAN
BY *Elmer J. Gorn*
ATTORNEY

Patented Apr. 15, 1952

2,592,719

UNITED STATES PATENT OFFICE 2,592,719

REMOTE DIRECTION FINDER SYSTEM

William D. McGuigan, Waltham, Mass., assignor to Raytheon Manufacturing Company, Newton, Mass., a corporation of Delaware Application November 19, 1949, Serial No. 128,433

5 Claims. (Cl. 343—112)

This invention relates to remote direction finder systems of the type having a master and remote stations.

The present practice in locating the position of a signalling transmitter is to have at least two independent direction finding stations at separated points, each of which takes a reading on the direction of the signal source. This information is then relayed to a headquarters station where, by triangulation, the location of the signalling transmitter is found.

There are many disadvantages to this practice. Each station requires a complement of personnel for its operation which, besides being expensive, requires that each station be located in accessible areas which may not be conductive to the best directional finding characteristics. The amount of traffic which may be handled in this way is limited by time-consuming manual procedures in receiving requests from the headquarters station, obtaining directional data, relaying this data back to the headquarters station, determining from this data flat chart position, and correcting this determination to obtain spherical map position. This invention overcomes these disadvantages by providing a master station which controls each remote station and automatically receives and presents data from the remote stations on a chart of the network area in a way to provide a continuous visual pattern designating the location of the outside signalling transmitter.

The present embodiment of the invention accomplishes this by a goniometer at each remote station arranged to shift the phase of a signal from the master station in accordance with the direction of the outside signalling transmitter whose location is to be determined. This phase-shifted signal is automatically transmitted back to the master station where it is compared in phase to a reference signal of the same frequency in which compensation for phase shifts other than that by the goniometer have been made. The comparison is effected by a continuous phase indicator which is calibrated to give the bearing of the transmitter with respect to the remote station.

A proper basis for phase comparison is made possible by incorporating a master oscillator from which the above-mentioned compared signal and other operating signals in the invention are derived. By this means, synchronous operation between the goniometer directional phase-shifting arrangement and the phase indicator at the master station is achieved. A phaser inserted in the circuit of the reference signal at the master station provides the means for correcting, for example, phase differences due to distance between the master station and the remote station and thereby provides a reference phase from which the phase change due only to direction of the outside signalling transmitter is to be measured.

The present embodiment incorporates these features in an apparatus particularly adaptable to both the 500 kilocycle and 375 kilocycle band frequencies used in existing direction finding services. Two-band frequency operation is made possible by a heterodyning and a two-position relay arrangement to be hereinafter more fully explained. Other embodiments adaptable for use over a band of outside signal frequencies or with only a single outside signal frequency are simplified versions of the above apparatus. This later embodiment is particularly applicable for such private uses as in fishing fleets for locating the individual boats of the fleet without expensive installations in each boat.

Continuous visual image of the position of the outside signalling transmitter is achieved at the master station by providing a phase indicator for each remote station in the form of a lamp arranged to throw a pencil of light and to rotate in synchronism with the scan of the goniometer. The lamp is triggered to flash at a point in its rotation corresponding to the shift in phase caused by the goniometer as mentioned above, thereby creating a stroboscopic pencil of light having a directional relation determined by the location of the location of the outside signalling transmitter. One such phase indicator for each of the remote stations is arranged, for example, under a translucent chart of the area served by the direction finder net at a point on the chart corresponding to the location of the remote station. The intersection of the pencils of light so generated directly indicate the point on the chart at which the transmitter is located.

The foregoing and other advantages, objects and features of the invention will be better understood from the following description of exemplifications thereof, reference being had to the accompanying drawings forming part of this specification.

In the drawings:

Fig. 1 is a schematic diagram showing the master and remote station apparatus of a preferred embodiment of this invention;

Fig. 2 is a schematic diagram of a two-position relay suitable for use in Fig. 1;

Fig. 3 is a schematic diagram of a phase measuring and indicating device used in the invention;

Fig. 4 is a schematic diagram of a suitable circuit for triggering the lamp in Fig. 3;

Figure 5:
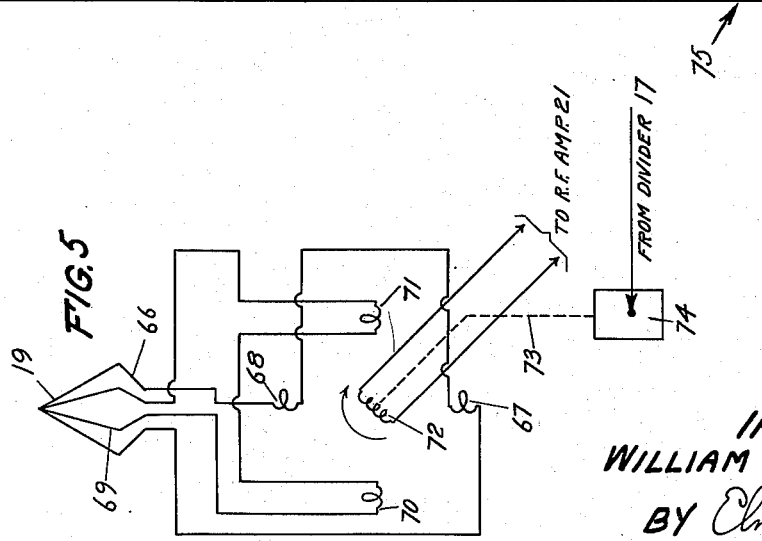
Fig. 5 is a schematic diagram of a goniometer arrangement suitable for use in the invention.

Referring to the drawings in more detail, Fig. 1 illustrates an embodiment of this invention particularly adapted to operate on either 500 or 375 kilocycle outside signal band frequencies. At a master station 10, a signal is generated by a tunable master oscillator 11 which, in this instance, is tuned to produce a signal frequency equal to the $1/256$ sub-harmonic of 125 kilocycles or approximately 488 cycles per second. When a switch 12 is closed, the signal is amplified by an amplifier 13 and sent through a convenient radio or telephone link 14 to a remote station 15, where the signal is amplified by an amplifier 16. The $1/8$ sub-harmonic frequency of the amplified signal obtained at a frequency divider 17 is led to a goniometer 18 having a cross-looped antenna 19. One such goniometer arrangement, to be described hereafter, is shown in Fig. 5. A radio signal of, for example, 375 kilocycles, from an outside transmitter (not shown) whose location is to be determined, is picked up by antenna 19 and passes from the antenna 19 to the goniometer 18 from which, due to the goniometer scan, it emerges as a signal modulated at twice the frequency of the signal from the divider 17 (about 162 cycles per second), but having a change in phase determined by the location of the outside transmitter. This modulated signal is sent to a superheterodyne receiver 20 having generally a radio frequency untuned amplifier stage 21, a mixer stage 22 with the heterodyning frequency signal of 125 kilocycles being derived from the 488 cycle signal by a 256th harmonic frequency multiplier 23 connected to the output of the amplifier 16, and a 500 kilocycle intermediate frequency amplifier 24 leading to a detector 25 with an automatic volume control 26. A two-position relay 27, more fully explained below, connects, by means of a relay energizer 28 and double throw switch 29, the mixer 22 to amplifiers 21 and 24 as shown when the system is used for 375 kilocycle outside signals as in the present instance. In this case, the modulated 375 kilocycle signal from the amplifier 21 passes through the mixer 22, where it is mixed with the 125 kilocycle signal from the multiplier 23. The 500 kilocycle side band is then amplified by the intermediate frequency amplifier 24. The automatic volume control 26 is designed with a relatively long time constant so that it does not respond to the frequency of modulation and, therefore, permits detection of a 162 cycle signal by the detector 25. This detected signal is then put in convenient form for transmission to the master station, in this instance, by providing a carrier signal having a frequency of 1953 cycles derived from the 488 cycle signal of amplifier 16 by a 4th harmonic frequency multiplier 30 and amplified by a combined carrier frequency amplifier and modulator 31 to which the detected signal is added by an amplifier 32. The above are adjusted so that the resulting signal is made to appear preferably as one having 100% modulation as shown at 33. Nodes 34 occur at every half cycle of the goniometer scan since the sensitivity pattern of the antenna 19 is in the shape of a figure 8. The signal 33 is then sent by a convenient telephone or radio link 35 to the master station 10. In this instance, a 488 cycle signal in the link 14 and a 1953 carrier frequency in the link 35 from the remote station were used because these frequencies are adaptable for direct use with existing telephone line signal linkages between master and remote stations, and are convenient sub-harmonics of the 125 kilocycle heterodyning frequency. Where radio signal linkages are desired, other more suitable carrier frequencies may be used.

At the master station 10 the signal 33 is amplified and detected by a suitable amplifier 36 and detector 37 and led to a continuous phase indicator 38. Any suitable continuous phase indicator may be used; a preference, however, is expressed for a particular visual inspection arrangement to be hereinafter more fully described. At the indicator 38, the phase of the signal from detector 37 is compared to the phase of another signal obtained from the master oscillator 11 by a $1/8$ sub-harmonic frequency divider 39 having a reference phase relation set by a suitable phaser 40. To obtain the reference phase, an outside signal from a known location is used. For convenience and example, a 375 kilocycle signal from a transmitter (not shown) at the master station may be used as the known reference. This signal, picked up by the antenna 19 at remote station 15, will cause a directional phase shift in the 162 cycle signal which is then transmitted to indicator 38 where phase changes due to equipment and distance between the remote and master stations are compensated for in the reference signal from divider 39 by phaser 40 so as to make the indicator give a correct reading for the known station. Thereafter, changes in phase caused by the goniometer 18 due solely to signals from outside transmitters will appear on indicator 38 which may, therefore, be calibrated to give directly the bearing of the outside transmitter.

It should be understood here that some goniometers and phasers, instead of altering the phase of the particular signal led to them, accomplish the same result by creating an entirely new signal with the desired altered phase, and of the same frequency as the original signal. Both of these types of phasers and goniometers may be used in this invention and are intended to be included even though referred to as changing the phase of the original signal.

The frequency dividers 17 and 39 in the system are for the same fractional sub-harmonic. Therefore, the signal being compared at indicator 38 will always have the same frequency relation. The frequency multiplier 23 varies the heterodyning frequency as the signal from the tunable master oscillator 11 is varied. Therefore, signals from outside transmitters having frequencies varying from 375 kilocycles may be corrected for proper amplification in the 500 kilocycle amplifier 24 by proper tuning of the master oscillator 11.

Thus by providing at 13, 16, 21, 31 and 36 amplifiers covering a suitable range of frequencies, the above-described system may be made to operate on outside signal frequencies of a considerable range if desired. The particular outside signal ban to be used is controlled by tuning the oscillator 11.

Since the reference setting of the indicator 38 may be accomplished by the rapid operation of switching-in the known transmitter, and adjusting the phase of the reference by phaser 40, such reference phase correction may properly be made before each reading on the bearing of an unknown transmitter. Therefore, for reliable operation of this invention, it is necessary that the tunable master oscillator 11 be relatively constant in phase and frequency for only short periods of time. The terms "fixed phase" and "fixed frequency" oscillator used in this application are accordingly intended to apply also to those situations where the variation is relatively slow.

For outside transmitter signals of 500 kilocycles, the multiplier 23 and mixer stage 22 are shunted out of the receiver 20 by double relay switch 27, thus permitting passage of the signal directly from the amplifier 21 to the 500 kilocycle intermediate frequency amplifier 24. The relay 27 is of a type which is controllable from the master station 10. A suitable relay energizer circuit for this purpose is shown, for example, in Fig. 2, which is arranged to operate when a momentary interruption of the signal from the master oscillator occurs as, for example, when the switch 12 is momentarily opened. This is accomplished by providing a relay activating solenoid 51 and 52 in the plate lead of each of the two triodes $T_1$ and $T_2$ in a monostable multivibrator known as a "flip-flop" circuit with the plate leads also connected to the positive terminal of a power source as battery B. The 488 cycle signal derived from amplifier 16 is further amplified by amplifier 41 and changed to the form of a pulse 42 by rectifier 43 and condenser 44. This pulse 42 is fed through common terminal 45 to the cathodes of both tubes $T_1$ and $T_2$ and provides a positive triggering pulse whenever the 488 cycle energy is turned on. When the 488 cycle energy is turned off, the resulting negative pulse does nothing to the "flip-flop"; but when the 488 cycle energy is turned back on, the positive transient causes the "flip-flop" to change its conduction from one side to the other, thus energizing the other coil and causing the relay to throw the switch 29 from one set of terminals to the other. Since the 488 cycle energy is controlled by switch 12, the relay 27 may be operated as desired from switch 12 at the master station.

An alternate construction of this invention for use on only one frequency band for outside transmitter signals is provided by removing the relay 27, mixer 22 and frequency multiplier 23, and connecting the output of amplifier 21 to the input of amplifier 24. In this embodiment, the oscillator 11 and all amplifiers in the system may be of the fixed frequency type. Such a system, while limited as to frequency bands of operation, has the advantages of economy and high noise discrimination characteristics.

The phase indicator 38 preferably used is illustrated schematically in Fig. 3. A synchronous motor 50 controlled by the reference signal from phaser 40 is made to rotate in synchronism with the frequency of the reference signal. A rotating shaft 51 extending from the motor 50 has mounted on it an opaque hood 52 having a slot 53 for directing a pencil of light 54 from a lamp 55, such as a mercury tube, located inside the hood 52. Slip rings 56 and 57 on the shaft 51 provide electrical contact between the lamp 55 and electric lines 58 and 59, respectively. Lines 58 and 59 are led to a power source, such as a battery, controlled by the signal from detector 37 in such manner that the light 55 will be made to glow intermittently at specified points in the rotational cycle of the hood 52. A suitable arrangement for accomplishing this by making the lamp 55 glow each time the wave of the signal from detector 37 reaches a node is shown in Fig. 4. Wave 60 of the signal from the detector 37 passes through a condenser 61 and a transformer 62 and appears at the grid of a gas-filled discharge tube 63, such as a mercury triode, as a pulsed wave 64. The pulses correspond to nodes of the wave 60, each of which occurs at half cycle intervals of motor 50, and cause current to flow in line 58 intermittently corresponding to the nodes of wave 60. The lamp 55 is thereby caused to glow stroboscopically for each pulse at each half cycle of the hood 52.

One goniometer arrangement suitable for use in the invention is shown in Fig. 5. The crosslooped antenna 19 has one of its loops 66 connected to a pair of primary coils 67 and 68 to form a closed circuit, and the other of its loops 69 connected to another pair of primary coils 70 and 71 to form another closed circuit. The coils 67, 68, 70 and 71 are arranged to give crossed fields and are coupled to a secondary coil 72 as shown. The secondary coil 72 is rotated by a linkage 73 and a synchronous motor 74. The rotational speed of the synchronous motor 74 is controlled by the signal from the frequency divider 17 so as to rotate in synchronism with this signal and thereby cause the coil 72 to rotate at this same speed herein referred to as the scan frequency of the goniometer 18. Because of the directional characteristics of the antennas 19, an outside radio signal intercepted by them will create an inductive field pattern in the primary coils determined by the direction of the radio signal source. The coil 72, as it rotates in this field, produces a modulated signal of the same frequency as the outside radio signal. The frequency of the modulations is equal to twice the scan frequency and the phase of the modulations is determined by the direction of the outside radio signal source.

Figure 6:
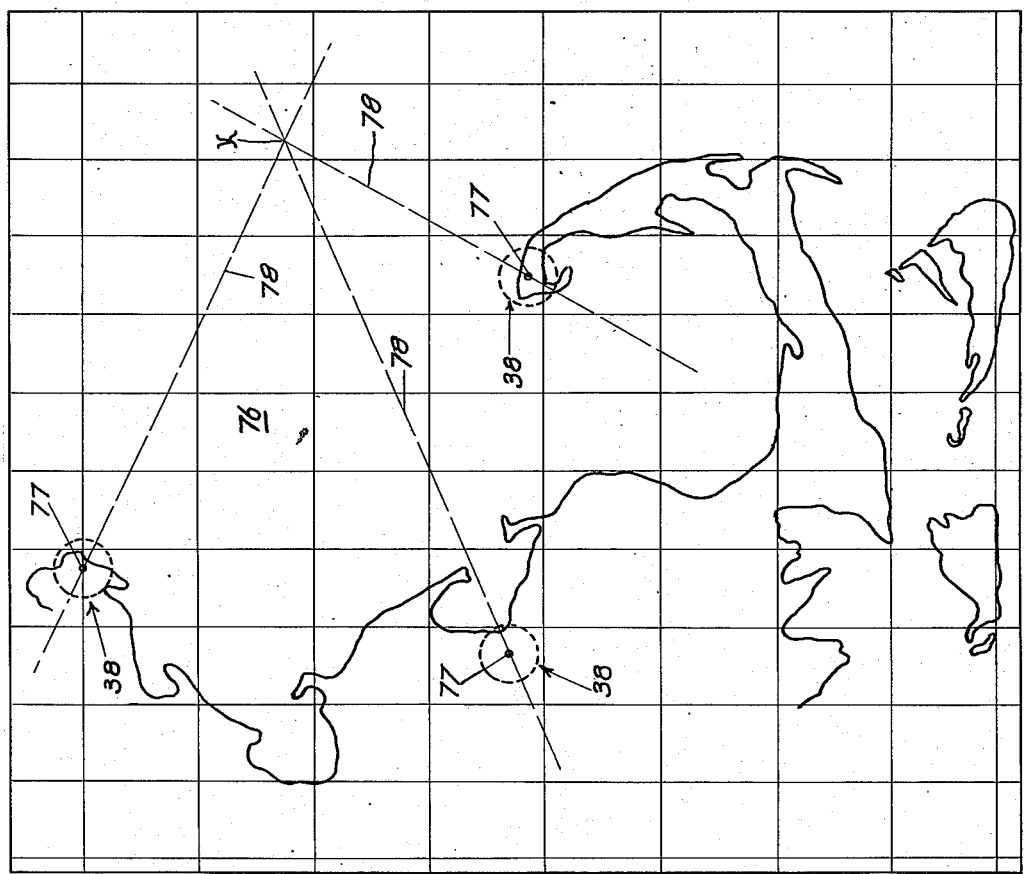
Fig. 6 is a plan view of a visual inspection indicator in the invention.

At the master station (see Fig. 6), a translucent screen 75 with a chart 76 of the area serviced by the direction finding network of remote stations is arranged with an indicator 38 for each remote station. Each indicator 38 is preferably of the type shown in Fig. 3 and located underneath the chart at a point on the chart corresponding to the location 77 of each remote station. The axis of rotation of the lamp is perpendicular to the chart so that, each time it glows, it throws a pencil of light on the screen 75 visible on the chart 76 as a line 78. In this arrangement, the reference phase position is obtained by adjusting the phaser 40 so that, for an outside signal from the master station, the pencil of light from each indicator will be directed toward a point on the chart corresponding to the location of the master station. Having thus corrected for phase differences caused within the system itself, an outside signal from an unkonwn source, such as X, may be determined by visual inspection as the point of intersection of the pencils of light 78 from each remote station 77. The surface of the screen 75 is curved in a manner corresponding to the contour of the earth's surface, so as to make the chart 76 correspond to the contour of a section of the earth's sphere covering the network area. Thus, the bearing of the outside signalling transmitter may be read directly as the point of intersection X without further correction. A flat chart may also be used, but, in such case, the point of intersection X must be corrected to give a true indication of position.

This invention is not limited to the particular details of construction and processes described, as many equivalents will suggest themselves to those skilled in the art. It is accordingly desired that the appended claims be given a broad interpretation commensurate with the scope of the invention within the art.

What is claimed is:

1. A direction finding system comprising: a master station including means for generating a first signal and means for transmitting the same; a remote station including means for receiving said first signal and means for receiving a second signal from a source outside of said system; means at said remote station for shifting the phase of said first signal as a function of the direction from which said second signal is received; means at said remote station for transmitting said phase-shifted signal; means at said master station for receiving said phase-shifted signal; and means at said master station for measuring the amount of said phase shift.

2. A direction finding system comprising: a master station including means for generating a first signal and means for transmitting a portion of the same; a remote station including means for receiving said transmitted portion of said first signal and means for receiving a second signal from a source outside of said system; means at said remote station for shifting the phase of said transmitted portion of said first signal as a function of the direction from which said second signal is received; means at said remote station for transmitting said phase-shifted signal; means at said master station for receiving said phase-shifted signal; means at said master station for measuring the amount of said phase shift; and means at said master station receptive of another portion of said first signal and cooperable with said measuring means for correcting said phase shift to compensate for any phase error introduced therein by characteristics inherent in said system.

3. A direction finding system comprising: a master station including means for generating a first signal and means for transmitting the same; a remote station including means for receiving said first signal and means for receiving a second signal from a source outside of said system; means at said remote station for shifting the phase of said first signal as a function of the direction from which said second signal is received; means at said remote station for transmitting said phase-shifted signal; means at said master station for receiving said phase-shifted signal; means at said master station for measuring the amount of said phase shift; and means at said master station for translating said phase shift into a visual indication of the direction from which said second signal was received at said remote station from said outside signal source.

4. A direction finding system comprising: a master station including means for generating a first signal and means for transmitting the same; a remote station including means for receiving said first signal and means for receiving a second signal from a source outside of said system; means at said remote station for shifting the phase of said first signal as a function of the direction from which said second signal is received; means at said remote station for transmitting said phase-shifted signal; means at said master station for receiving said phase-shifted signal; means at said master station for measuring the amount of said phase shift; a geographical chart at said master station including a designation of the location of said remote station; and means at said master station for translating said phase shift into a visual indication on said chart of the direction from which said second signal was received at said remote station from said outside signal source.

5. A direction finding system comprising: a master station including means for generating a first signal and means for transmitting the same; a plurality of remote stations each of which includes means for receiving said first signal and means for receiving a second signal from a source outside of said system; means at each of said remote stations for shifting the phase of said first signal as a function of the direction from which said second signal is received thereat; means at each of said remote stations for transmitting said phase-shifted signal; means at said master station for receiving all of said phase-shifted signals; means at said master station for measuring the amount of each of said phase shifts; a geographical chart at said master station including designations of the locations of all of said remote stations; and means at said master station for translating said phase shifts into visual indicia on said chart of the respective directions from which said second signal was received at each of said remote stations from said outside signal source.

WILLIAM D. McGUIGAN.

REFERENCES CITED

The following references are of record in the file of this patent:

UNITED STATES PATENTS

| Number | Name | Date |
| --- | --- | --- |
| 2,171,561 | Hooven | Sept. 5, 1939 |
| 2,198,113 | Holmes | Apr. 23, 1940 |
| 2,248,215 | Budenbom | July 8, 1941 |
| 2,428,966 | Gage | Oct. 14, 1947 |
| 2,470,787 | Nosker | May 24, 1949 |
| 2,485,633 | Rusch et al. | Oct. 25, 1949 |